3,265,580
PROCESS FOR THE PREPARATION OF PROLACTIN
John W. Nelson, Kalamazoo, Mich., assignor to The Upjohn Company, Kalamazoo, Mich., a corporation of Delaware
No Drawing. Filed May 4, 1964, Ser. No. 364,840
4 Claims. (Cl. 167—74)

This invention relates to a process of preparing a biologically active product from pituitary glands, more particularly a process of preparing prolactin from pituitary glands.

It is known that mammalian pituitary glands are a source of several biologically active substances, including a growth factor which influences skeletal development and the growth and metabolism of many tissues; a follicle stimulating factor, which stimulates the growth and maturation of ovarian follicles; a luteinizing factor, which causes the luteinization of ovarian follicles; a thyrotropic factor, which is involved in normal thyroid development and function; a prolactin factor, which produces growth and secretory changes in the crop glands of pigeons and which is involved in mammary gland proliferation and secretion in mammals; and an adrenocorticotropic factor, which stimulates the adrenal cortex.

These factors are complex substances of protein-like nature, a circumstance which renders exceedingly difficult their separation and preparation in useful form. Processes for preparing prolactin are known in the art, for example, Cole and Li, J. Biol. Chem., 213, 197 (1955), and Archiv. of Biochem. and Biophysics, 78, 392–400 (1958), and Bates and Riddle, J. Pharm. and Exp. Therapeutics, 55, No. 3, 365–371, November 1935. Nevertheless, the relative scarcity of a naturally-occurring raw material such as pituitary glands and the ever-increasing demands therefor render imperative unremitting efforts to develop and perfect less costly processes.

It has now been found that a sequence of steps provides an improved process for preparing prolactin in that the starting material is a glandular residue from which other factors, notably growth factor, have been removed and saved instead of being destroyed or impaired during the prolactin process. Moreover, the process provides improvement in that a preliminary lower alkanol (1 to 3 carbon atoms, inclusive, methanol, ethanol, propanol and isopropanol) fractionation prevents subsequent troublesome emulsification in a later solvent partition step. This is in contradistinction to preliminary steps in the art processes, such as the acidified acetone step of Cole and Li.

The starting material for the novel process is mammalian pituitary glands, fresh, frozen, or desiccated in plain acetone. Ovine, bovine and porcine glands are used, preferable frozen anterior lobes of beef pituitaries.

Generally described, the process comprises a series of steps starting with extraction of the pituitary glands with 0.3 M KCl solution, preferably at a temperature no higher than about 10° C. and at a pH of from about 5 to 6, preferably pH 5.5. The insoluble portion and the extract are separated, preferably by decantation and centrifugation. The extract contains pituitary factors other than prolactin, particularly growth hormone, and is used for recovery of the latter.

The insoluble portion of glandular residue contains crude prolactin activity and is processed further by dispersion and extraction in q.s. alkanol, preferably ethanol, to provide a menstruum containing 60% to 80% alkanol, preferably 70%. The pH is adjusted to pH 9 to 10, preferably 9, with NaOH and extraction is allowed to proceed for from 1 to 16 hours at about 25° C., preferably for about 2 hours. The extract and the insoluble portion are separated by filtration and the soluble extract is reserved. The insoluble material is re-extracted with 60 to 80% alkanol, preferably 70%, at pH 9 to 10, preferably 9, and again the soluble and insoluble portions are recovered by filtration. The two soluble portions are combined, adjusted to pH of about 5 to 6, preferably 5.7, with hydrochloric acid, and 4 volumes of the lower alkanol are added at a temperature of about 5° to −10° C. The insoluble precipitate is recovered, preferably at the centrifuge, and the soluble portion is discarded. The insoluble portion is processed further by dispersion in water at a pH of 9 to 10, preferably 9.5 and adjusting this dispersion to a pH of 2 to 4, preferably pH 3, to cause the precipitation of an insoluble fraction, which is discarded. The soluble portion containing biologically active prolactin is recovered by filtration or centrifugation and salted out by the addition of sodium chloride, preferably solid sodium chloride, to 0.06 saturation. The salting out provides a prolactin-active precipitate, which is recovered and saved for further processing. Further processing is carried out by re-solution in aqueous solution at pH about 9 to 10 and subsequent fractional adjustment of the pH to about 6.3 and about 5.6. The precipitate obtained at pH about 6.3 is discarded, and the soluble portion is recovered. Upon lowering the pH of the soluble portion to pH about 5.6, a biologically active prolactin precipitate is obtained. The soluble material at this pH is discarded. The active insoluble precipitate obtained at pH about 5.6 is recovered and used for further purification in a solvent distribution system. For ease of handling the pH 5.6 precipitate is adjusted in water to pH of about 9, frozen, and dried from the frozen state. However, the recovered pH 5.6 precipitate may be directly used in the solvent distribution system without the lyophilization step.

A solvent distribution system is prepared by equilibrating an aqueous solution of dichloroacetic acid of 0.4% concentration against 2-butanol. The aqueous (lower) phase of the system has a pH of about 2.5. It is used to dissolve the pH 5.6 prolactin fraction or the lyophilized product obtained therefrom, with pH adjustment of the solution to about 2.5 as required. Successive extractions of the adjusted solution are carried out preferably by passage through a series of funnels wherein the adjusted solution is the lower phase and the equilibrated 2-butanol is the upper phase. The lower phases are combined, adjusted to pH 2.5 to 3.5, preferably 3.0, with q.s. sodium hydroxide and dialyzed against purified water U.S.P. at a temperature of from about 5° to 25° C., preferably 10° C. The dialyzed solution is adjusted to pH of about 8 with q.s. NaOH and concentrated preferably by lyophilization to a small volume. The pH of the concentrate is adjusted to about 5.6 with q.s. hydrochloric acid to precipitate the purified prolactin, which is recovered preferably at the centrifuge, the soluble material being discarded. The active precipitate is dissolved in a minimum amount of water, adjusted to pH of about 7.5, with NaOH, frozen, and dried from the frozen state. The dried powder is obtained in a yield of from about 1 to about 2 grams per kilo of starting material. The powder assays from about 10 to about 30 international units of prolactin activity in the test performed according to the pigeon crop sac technique of Meites and Turner in Hormone Assay, C. W. Emmens, page 252, Academic Press, New York, N.Y., 1950.

*Example*

1 kilo of frozen bovine anterior pituitaries were ground with 1 kilo of Dry Ice and the whole was suspended in 5 liters of 0.3 M KCl solution at a temperature of about 5° C. The pH was adjusted to about 5.5 with 1 N HCl and extraction carried out by stirring for about 8 hours at about 2° C. The extraction mixture was allowed to settle, the clear supernatant was decanted, and the balance of the extraction mixture was centrifuged. The soluble portion and the supernatant were combined for recovery of growth hormone. The insoluble centrifuged residue was recovered and used for further processing.

The residue was extracted with q.s. 95% ethanol to provide 4 liters of 70% ethanol. The pH was adjusted to 9 with 1 N NaOH and the whole was stirred for about 2 hours at room temperature. Filtration separated the soluble and insoluble portions. The former was reserved. The insoluble portion was re-extracted with 1 x 4 liters of 70% ethanol at pH 9.5 and 2 x 2.5 liters of 70% ethanol at pH 9.5. The final insoluble portion was discarded and the several soluble extracts were combined. The combined soluble portions were adjusted to pH 5.7 with 1 N HCl, and 4 volumes of 95% ethanol at about −10° C. was added causing precipitation of an insoluble fraction. The whole was centrifuged, and the soluble portion was discarded. The insoluble precipitate was recovered and processed further.

The insoluble precipitate was dispersed in 375 ml. of water with pH adjustment to pH 9 by the addition of 1 N NaOH. The whole was adjusted to pH 3 with 1 N HCl. The supernatant and the insoluble portion were separated at the centrifuge and the supernatant was reserved. The insoluble portion was dispersed in 375 ml. of water with pH adjustment to pH 9 by the addition of 1 N NaOH. The whole was adjusted to pH 3 with 1 N HCl. The supernatant and the insoluble portion were separated at the centrifuge. The insoluble portion was discarded.

The two supernatants were combined and solid NaCl was dissolved therein to provide 0.06 saturation. The whole was centrifuged and the supernatant was discarded.

The salted out insoluble product was dispersed in 500 ml. of water by adjustment of the pH to 9 with 1 N NaOH. The whole was adjusted to pH 6.3 with 1 N HCl. A first pH 6.3 supernatant and a first pH 6.3 insoluble portion were separated at the centrifuge. The first pH 6.3 insoluble portion was reserved.

The first pH 6.3 supernatant was adjusted to pH 5.6 with 1 N HCl, cooled to about 0° C. and centrifuged. A first pH 5.6 insoluble portion was reserved an a first pH 5.6 supernatant was discarded.

The first pH 6.3 insoluble portion was dispersed in 250 ml. of water by adjustment of the pH to 9 with 1 N NaOH. The whole was adjusted to pH 6.3 with 1 N HCl. A second pH 6.3 insoluble portion and a second pH 6.3 supernatant were separated at the centrifuge. The second pH 6.3 insoluble portion was discarded. The second pH 6.3 supernatant was adjusted to pH 5.6 with 1 N HCl, cooled to about 0° C. and centrifuged. A second pH 5.6 insoluble portion was reserved and a second pH 5.6 supernatant was discarded.

The two pH 5.6 insoluble portions were combined in 150 ml. of water with pH adjustment to pH 9 with 1 N NaOH. The whole was frozen and dried in vacuo from the frozen state to yield a dry powder weighing 1.9 gm.

An immiscible solvent system was prepared by equilibrating an aqueous solution containing 0.4% dichloroacetic acid (w./v.) with 2-butanol. The above-obtained dry powder was dissolved in 250 ml. of the aqueous phase by pH adjustment to about 2.5. A 10-separatory-funnel system was set up, each funnel containing 500 ml. of 2-butanol upper phase. The 250 ml. of prolactin-containing aqueous phase was passed in succession through each of the 10 funnels, each passage consisting of adequate mixing, settling and withdrawal of the lower phase. Nine additional 250 ml. portions of aqueous phase were passed successively through the funnel system.

The 10 portions of lower phase were combined, adjusted to pH about 3.0 with 1 N NaOH and dialyzed against 5 volumes of purified water, U.S.P., at about 4° C. for 24 hours and against 10 volumes for 48 hours.

The dialyzed solution was adjusted to pH 8.2 and lyophilized to a volume of 375 ml. The solution was thawed and adjusted to pH 5.6 with 1 N HCl, stored at 0° C. overnight and centrifuged. The supernatant was discarded. The pH 5.6 insoluble precipitate was dissolved in 300 ml. of water by adjustment of the pH to 7.5 with 1 N NaOH. The adjusted solution was frozen and lyophilized to yield 1.0 gm. of amorphous dry powder. Assay by the pigeon crop sac method of Meites and Turner showed a potency of 17.8 I.U. per mg.

What is claimed is:
1. A process of preparing prolactin which comprises:
   (1) extracting mammalian pituitary glands with about 0.3 M KCl solution, separating and recovering the insoluble portion thereof,
   (2) extracting said insoluble portion with about 60 to about 80% (v./v.) of a lower alkanol containing 1 to 3 carbon atoms, inclusive, separating and recovering the extract,
   (3) adding q.s. lower-alkanol to the recovered extract to increase the alkanol concentration to about 90%, separating and recovering an insoluble precipitate,
   (4) dissolving the insoluble precipitate in water at pH about 9 to about 10,
   (5) adjusting the solution to a pH of from about 2 to about 4, separating and recovering the soluble portion of the adjusted solution,
   (6) salting out a precipitate from the adjusted solution by addition thereto of sodium chloride to about 0.06 saturation,
   (7) separating and recovering the precipitate and dissolving it in aqueous solution of pH from about 9 to about 10,
   (8) adjusting the pH of the aqueous solution to pH about 6.3, separating and recovering the soluble portion thereof,
   (9) adjusting the pH of the soluble portion to pH about 5.6, separating and recovering the insoluble precipated portion thereof,
   (10) dissolving the precipitated portion in 0.4% dichloroacetic acid in water equilibrated against an equal volume of 2-butanol and adjusted to pH about 2 to about 3,
   (11) extracting the adjusted solution with 2-butanol equilibrated against an equal volume of 04% dichloroacetic acid in water.,
   (12) separating and recovering the extracted solution and adjusting to a pH of from 2.5 to 3.5,
   (13) dialyzing the adjusted solution against purified water and concentrating the dialyzed solution,
   (14) adjusting the concentrated solution to about pH 5.6,
   (15) separating and recovering an insoluble precipitate,
   (16) preparing a solution of the precipitate in water at pH 7 to 8, and
   (17) lyophilizing the solution to a dry powder.
2. The process of claim 1 wherein the pituitary glands are ovine pituitary glands.
3. The process of claim wherein the pituitary glands are porcine pituitary glands.
4. The process of claim 1 wherein the pituitary glands are bovine anterior pituitary glands and the lower alkanol is ethanol.

No references cited.

JULIAN S. LEVITT, *Primary Examiner.*

LEROY B. RANDALL, *Assistant Examiner.*